United States Patent
Liu et al.

(10) Patent No.: US 8,804,559 B2
(45) Date of Patent: Aug. 12, 2014

(54) METHODS FOR MONITORING CHANNEL SOUNDING QUALITY IN WLAN DEVICES

(75) Inventors: Jianhan Liu, San Jose, CA (US); Vishakan Ponnampalam, San Jose, CA (US); James June-Ming Wang, San Marino, CA (US)

(73) Assignee: MEDIATEK Singapore Pte Ltd., Singapore (SG)

( * ) Notice: Subject to any disclaimer, the term of this patent is extended or adjusted under 35 U.S.C. 154(b) by 197 days.

(21) Appl. No.: 13/373,305

(22) Filed: Nov. 10, 2011

(65) Prior Publication Data

US 2012/0120839 A1 May 17, 2012

Related U.S. Application Data

(60) Provisional application No. 61/412,876, filed on Nov. 12, 2010.

(51) Int. Cl.
| | |
|---|---|
| *G06F 11/00* | (2006.01) |
| *H04J 1/16* | (2006.01) |
| *H04L 1/00* | (2006.01) |
| *H04W 24/00* | (2009.01) |
| *H04L 12/26* | (2006.01) |

(52) U.S. Cl.
CPC .............. *H04W 24/00* (2013.01); *H04L 43/50* (2013.01)
USPC ............................ 370/252; 370/329; 370/328

(58) Field of Classification Search
CPC ..... H04W 24/00; H04W 72/04; H04W 88/08; H04W 76/00; H04L 43/50; H04L 43/0852
USPC .............. 370/310–350, 252; 455/402.11–450
See application file for complete search history.

(56) References Cited

U.S. PATENT DOCUMENTS

| | | | |
|---|---|---|---|
| 7,760,800 B2 * | 7/2010 | Bae et al. ...................... | 375/233 |
| 8,488,704 B2 * | 7/2013 | Zhang et al. .................. | 375/267 |
| 2006/0111129 A1 * | 5/2006 | Ihm et al. ...................... | 455/466 |
| 2006/0120476 A1 * | 6/2006 | Li et al. ......................... | 375/267 |
| 2007/0201568 A1 * | 8/2007 | Bae et al. ...................... | 375/260 |
| 2008/0008258 A1 * | 1/2008 | Tanabe .......................... | 375/267 |
| 2009/0238297 A1 * | 9/2009 | Zhang et al. .................. | 375/267 |
| 2010/0246494 A1 * | 9/2010 | Sanayei ........................ | 370/328 |
| 2012/0257605 A1 * | 10/2012 | Abraham et al. ............. | 370/338 |

* cited by examiner

*Primary Examiner* — Chuong T Ho
(74) *Attorney, Agent, or Firm* — Zheng Jin

(57) ABSTRACT

A method of monitoring channel-sounding quality for VHT WiFi devices is provided. A mobile station (the receiver) receives a sounding signal transmitted from an access point (the transmitter) over one or multiple sub-channels of a wide channel in a wireless network. The receiver performs channel estimation and determines an estimated channel response matrix. The receiver then calculates sounding quality for each valid sub-channel by computing an estimation error of the received sounding signal based on the estimated channel matrix. The receiver transmits a feedback message to the transmitter. The feedback message contains sounding quality information derived from the calculated channel sounding quality. If the channel sounding qualities for all valid sub-channels are poor, then a null VHT channel feedback frame is sent back to the transmitter.

18 Claims, 5 Drawing Sheets

METHODS FOR MONITORING CHANNEL SOUNDING QUALITY IN WLAN DEVICES

CROSS REFERENCE TO RELATED APPLICATIONS

This application claims priority under 35 U.S.C. §119 from U.S. Provisional Application No. 61/412,876, entitled "Methods for Monitoring Channel Sounding Quality in Wireless Local Area Network Transceivers," filed on Nov. 12, 2010, the subject matter of which is incorporated herein by reference.

TECHNICAL FIELD

The disclosed embodiments relate generally to wireless network communications, and, more particularly, to sounding and feedback in wireless local area networks.

BACKGROUND

Multi-user multiple-input multiple-output (MU-MIMO) transmission is becoming a new system technique to enable high system capacity in both the upcoming IEEE 802.11ac and the LTE (long-term evolution) standards. As compared to single-user MIMO (SU-MIMO), MU-MIMO has several key advantages. First, MU-MIMO allows for a direct gain in multiple access system capacity proportional to the number of access point antennas. Second, MU-MIMO allows the higher degree spatial multiplexing gain to be obtained without the need for higher number of antennas at the mobile stations by keeping the intelligence and cost at the access point. Third, MU-MIMO appears immune to most propagation limitations plaguing SU-MIMO communications because multiuser diversity can be extracted even in a simple line of sight (LOS) propagation environment. As a result, the LOS propagation, which causes degradation in single user spatial multiplexing schemes, is no longer a problem in the multiuser setting.

In contrast to the SU-MIMO transmission, where the mobile station receivers are equipped with sufficient number of antennas (equal to or greater than the number of spatial streams) and the capability of the signal processing to estimate the channel and to separate the spatial streams, it is crucial in a MU-MIMO transmission for the access points or routers to bear the most of the burden in the signal processing and hardware complexity to allow for simpler mobile station implementation. To achieve this aim, the access point or router should apply transmit beamforming (precoding), computed from channel knowledge acquired in the MU-MIMO downlink channel sounding and feedback to achieve an orthogonal (or near-orthogonal) transmission of multiple streams to multiple users, i.e., eliminating (or reducing) the amount of mutual interference between the transmission to multiple mobile stations. Under this condition, each mobile station only receives the spatial stream(s) intended for itself and not the interference from the spatial stream(s) intended for other mobile stations. With reduced number of spatial streams directed toward individual mobile stations, all mobile stations only need to be equipped with sufficient number of antennas for processing the spatial streams intended for itself and not worrying about eliminating the interference from other spatial streams.

FIG. 1 (Prior Art) illustrates a typical SU-MIMO and MU-MIMO process in a wireless communication system 100. For SU-MIMO, the receiver spatial processing occurs during the long training fields (LTFs) in the preamble before the arrival of the data payload. The receiver spatial processing is performed on a packet-by-packet basis. If the receiver spatial processing is not done correctly, for example due to interference, only that packet (e.g., packet 11 in FIG. 1) is affected and the erroneous transmission can be corrected by acknowledgement and re-transmission protocol as long as interference is no longer present in subsequent re-transmission.

For MU-MIMO, on the other hand, the channel knowledge and antenna weights at the transmitter are not updated frequently. The process of channel sounding and feedback adds a significant overhead to the system processing and it is typically performed at intervals comparable to the channel coherent time. If incorrect channel state information, e.g., due to received sounding signal corrupted by interference, is fed back and used at the transmitter, the sequence of frame exchanges based on the same transmit antenna weights are affected and the resultant communication errors are not correctable through the acknowledgement and re-transmission protocol. In the example of FIG. 1, when sounding and feedback 21 is corrupted by interference, the sequence of MU-MIMO frame exchanges 22, 23 ... are affected. Additionally, since the transmit beamforming weight is computed from aggregate channel measurements from multiple receivers, one incorrect feedback may produce a corrupted transmit (precoding) weights for all devices involved in the sounding and feedback process. Thus, it is critical to ensure the quality of the channel state information estimated from the sounding process.

Currently, there is no mechanism or protocol in the 802.11ac system to allow fast recovery from situation that estimated channel state information is corrupted. Furthermore, since wideband channel bandwidths are proposed by the IEEE 802.11ac standard, the sounding process is more susceptible to interferences, especially to sub-channel interferences. Therefore, it is important to know the channel estimation quality before providing feedback. Channel estimation quality also serves as an important metric for deciding dynamic channel bandwidth in IEEE 802.11ac systems.

SUMMARY

A method of monitoring channel-sounding quality for VHT WiFi devices is provided. A mobile station (the receiver) receives a sounding signal transmitted from an access point (the transmitter) over one or multiple sub-channels of a wide channel in a wireless network. The receiver performs channel estimation and determines an estimated channel response matrix. The receiver then calculates sounding quality for each valid sub-channel by computing an estimation error of the received sounding signal based on the estimated channel matrix. The receiver transmits a feedback message to the transmitter. The feedback message contains sounding quality information derived from the calculated channel sounding quality. If the channel sounding qualities for all valid sub-channels are poor, then a null VHT channel feedback frame is sent back to the transmitter.

The channel sounding quality is a combination of channel estimation error, sub-channel interference and other noise and distortion sources at the receiver. The sounding quality monitoring method utilizes the fixed bit pattern in VHT-SIG-B of the sounding signal to determine the quality of channel sounding results. In one embodiment, the channel sounding quality is computed by calculating an estimation error of the received sounding signal based on the estimated channel matrix for each valid sub-channel. The calculated sounding qualities are then compared with some thresholds. If the channel sounding qualities for all valid sub-channels are poor, then a null VHT channel feedback frame is sent back to the transmitter. The method is helpful to enhance the efficiency of the channel sounding and feedback, increase the network throughput, and enhance the robustness of link adaptation and dynamic bandwidth allocation.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

A multiple-input multiple-output (MIMO) wireless system employs multiple ($N_T$) transmit antennas and multiple ($N_R$) receive antennas for data transmission. A MIMO channel formed by the $N_T$ transmit and $N_R$ receive antennas may be decomposed into $N_S$ spatial channels, where $N_S \leq \min\{N_T, N_R\}$. The $N_S$ spatial channels are used to transmit $N_S$ independent data streams to achieve greater overall throughput. While single-user MIMO (SU-MIMO) considers access to the multiple antennas that are physically connected to each individual terminal (e.g., user), multi-user MIMO (MU-MIMO) allows a terminal to transmit (or receive) signals to (or from) multiple users simultaneously. The typical MU-MIMO usage scenario in IEEE 802.11ac involves an access point (AP) or router first acquiring the MIMO channel state information (CSI) through channel sounding, computing and applying transmit beamforming (precoding) weights, and then simultaneously transmitting multiple spatial streams to more than one mobile stations (STAs). With proper transmit beamforming (precoding), partial spatial processing is done at the access point to separate the spatial streams among the multiple users, and the remaining spatial processing is done at the receivers to decode the multiple spatial streams received.

Figure 1:
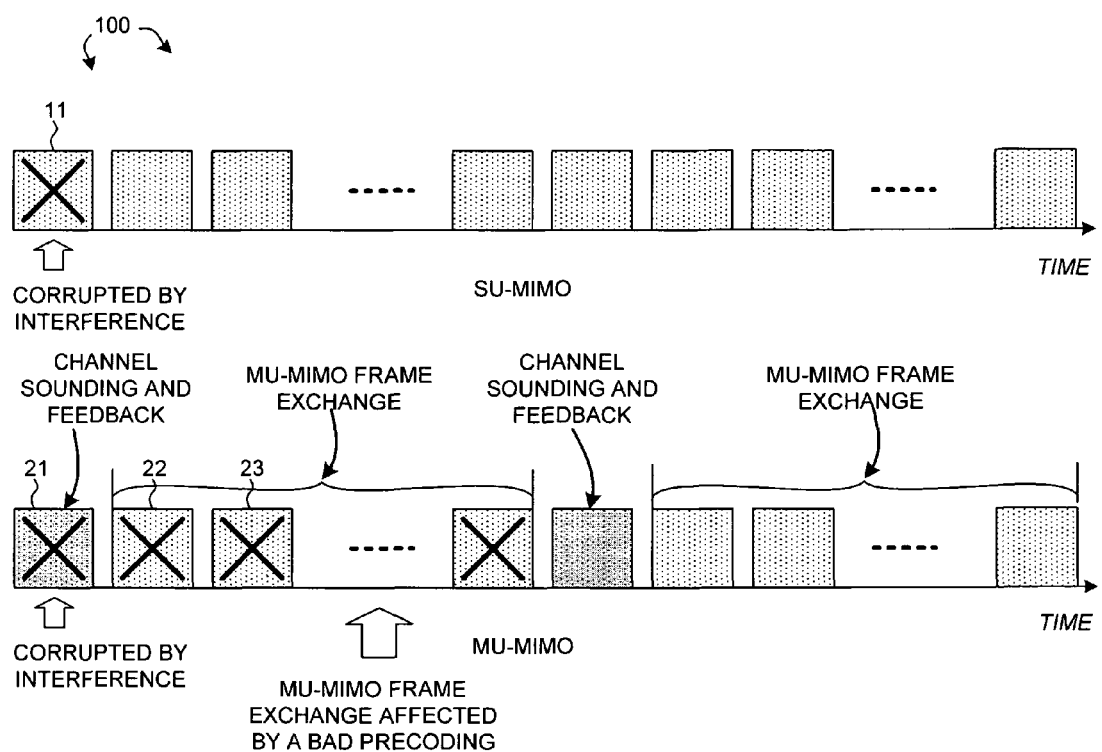
FIG. 1 (prior art) illustrates typical SU-MIMO and MU-MIMO processes in a wireless system.
Figure 2:
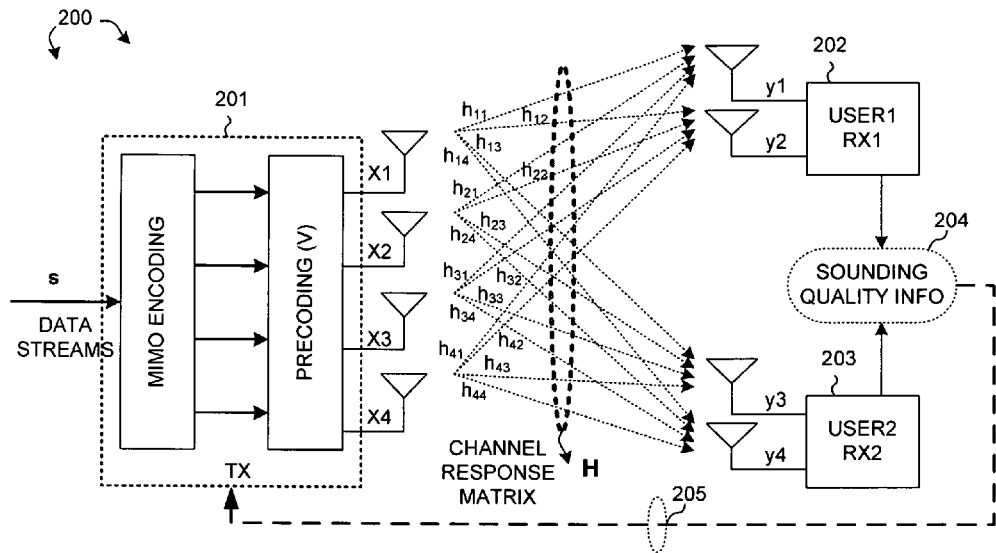
FIG. 2 illustrates a MU-MIMO scheme in a wireless system in accordance with one novel aspect.

FIG. 2 illustrates a MU-MIMO scheme in a wireless system 200 in accordance with one novel aspect. Wireless system 200 comprises an access point AP 201 (TX), a first mobile station STA 202 (user 1 or RX1), and a second mobile station STA 203 (user 2 or RX2). In the example of FIG. 2, four spatial streams are transmitted by the TX antennas with two spatial streams intended for each receiver. The complex coefficients $h_{11}$, $h_{12}$, $h_{13}$, and $h_{14}$ represent the transmission from $x_1$ antenna arriving at $y_1$, $y_2$, $y_3$, and $y_4$ antennas. The complex coefficients $h_{21}$, $h_{22}$, $h_{23}$, and $h_{24}$ represent the transmission from $x_2$ antenna arriving at $y_1$, $y_2$, $y_3$, and $y_4$ antennas. The complex coefficients $h_{31}$, $h_{32}$, $h_{33}$, and $h_{34}$ represent the transmission from $x_3$ antenna arriving at $y_1$, $y_2$, $y_3$, and $y_4$ antennas. Finally, the complex coefficients $h_{41}$, $h_{42}$, $h_{43}$, and $h_{44}$ represent the transmission from $x_4$ antenna arriving at $y_1$, $y_2$, $y_3$, and $y_4$ antennas. The transmission from each of the four TX antennas arrives at each of the four RX antennas. The input-output relationship can be described mathematically as:

$$x = Vs \quad (1)$$

$$y = Hx + n \quad (2)$$

where
- s is a vector of input data symbols
- x is a vector to be sent from transmit antennas after applying precoding matrix V
- V is the precoder matrix, which can be derived from channel response matrix H
- H is the channel response matrix
- n is the noise and interference
- y is a vector of output data symbols to be received by receive antennas The goal of the transmit beamforming (precoding) is to generate desired transmit array antenna patterns such that two spatial streams are beamed toward the first receiver (RX1) while nulled toward the second receiver (RX2) and that the other two spatial streams are beamed toward the second receiver (RX2) while nulled toward the first receiver (RX1). In other words, if precoder matrix V is applied properly, then RX1 will only see the first two spatial streams and RX2 will only see the other two spatial streams. As a result, RX1 only needs two antennas to resolve the first two spatial streams while RX2 also only needs two antennas to resolve the other two spatial streams. With the proper transmit beamforming at the transmitter (TX), the overall receive antennas can be reduced from eight to four and a simpler system configuration can be achieved.

In order to apply MU-MIMO beamforming (precoding), the transmitting station is required to have the knowledge of the channel response matrix H. This requires the receiving stations to measure and estimate the channel response matrix H and then feedback the channel response matrix H to the transmitting station via sounding and feedback process. If the channel measurement is corrupted by, say interference, the transmit beamforming (precoding) matrix V derived from the feedback will lead to subsequent corrupted MU-MIMO frame exchange. The sequence of corrupted MU-MIMO frame exchange is not correctable via the protocol of acknowledgement and re-transmission. Because the process of sounding and feedback imposes significant overhead, especially for MIMO-OFDM systems where multiple receiving stations are involved, it is desirable to perform the sounding and feedback procedure as infrequently as possible based on the coherent time of the channel. As a result, a corrupted transmit beamforming (precoding) matrix V will tend to be used for the duration until the next sounding and feedback.

Therefore, it is important to know the channel sounding and estimation quality before feedback to the transmitter. The channel sounding and estimation quality is a combination of channel estimation error, sub-channel interference, and other noise and distortion sources at the receiver. In one novel aspect, each of the receivers 202 and 203 calculates and monitors channel sounding and estimation quality and feedbacks channel sounding quality information 204 to the transmitter 201 via a feedback channel 205. Note that this sounding and feedback process for MU-MIMO is identical for that for transmit beamforming. The same discussion presented here would also apply to transmit beamforming.

Figure 3:
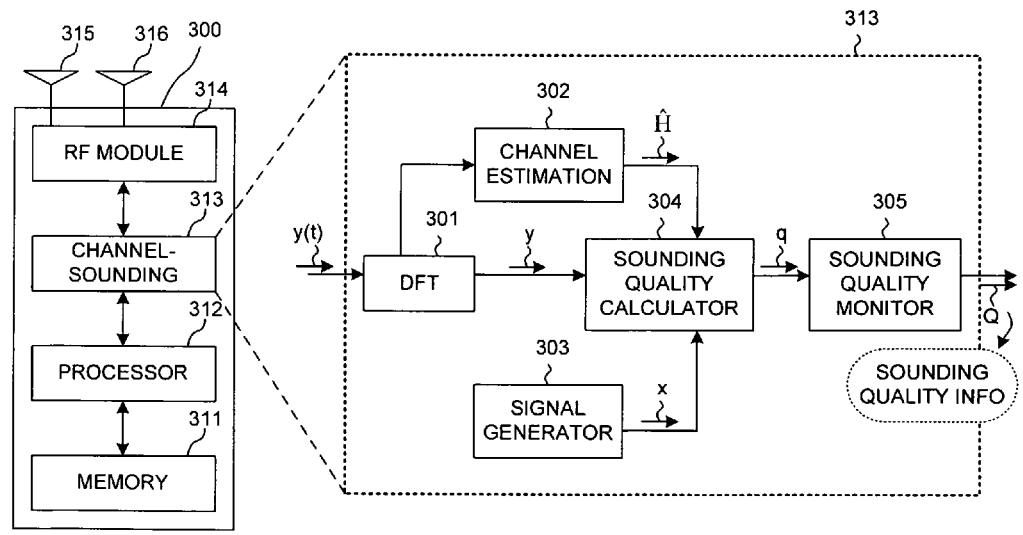
FIG. 3 illustrates a simplified block diagram of a mobile station having a channel-sounding module in accordance with one novel aspect.

FIG. 3 illustrates simplified block diagrams of a mobile station 300 having a channel-sounding module in accordance with one novel aspect. Mobile station 300 comprises memory 311, a processor 312, a channel-sounding module 313, a radio frequency module 314 coupled to a plurality of antennas 315-316. The channel-sounding module 313 comprises a Discrete Fourier Transform (DFT) module 301, a channel estimation module 302, a signal generator 303, a sounding quality calculator 304, and a sounding quality monitor 305. DFT 301 converts a received sounding signal in time domain y(t) to frequency domain sounding signal y. Channel estimation module 302 estimates the channel and outputs an estimated channel response matrix $\hat{H}$. Signal generator 303 generates a sounding signal x with a fixed pattern. Sounding quality calculator calculates the sounding quality by using the inputs of y, $\hat{H}$, and x, and outputs sounding quality metrics $q_s$ for each valid sub-channel in the wireless system. Finally, sounding quality monitor 305 takes the input of $q_s$ and outputs sounding quality information Q. How to determine the sounding quality information Q in a sounding and feedback process is now described below with more details.

Figures 4, 5:
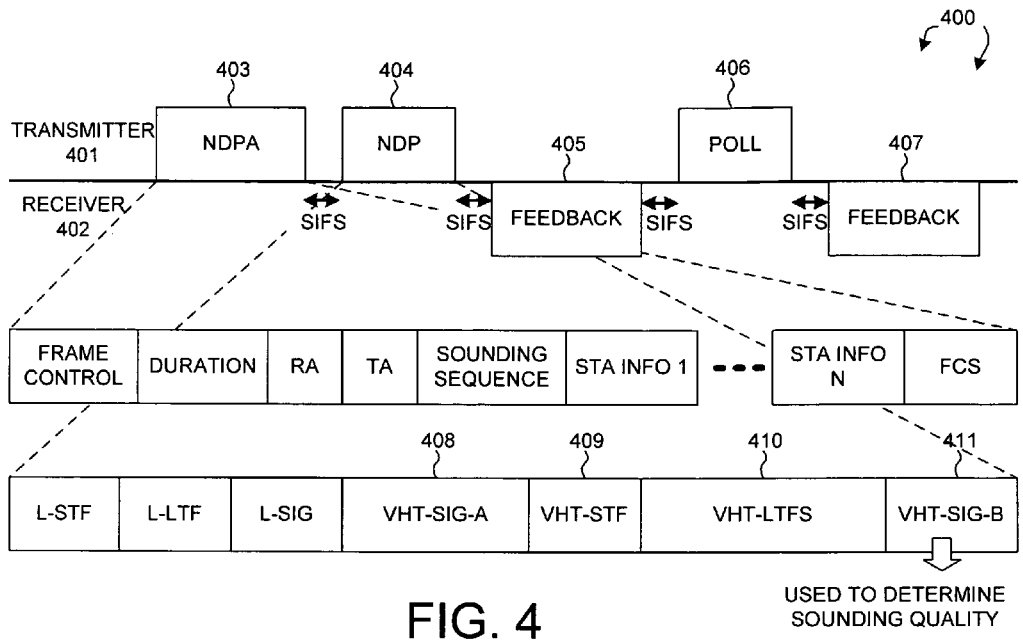
FIG. 4 illustrates one embodiment of a channel sounding and feedback process in a wireless system in accordance with one novel aspect.
FIG. 5 illustrates examples of sounding signals used in an IEEE 802.11ac system.

FIG. 4 illustrates a channel sounding and feedback process in a wireless system 400 in accordance with one novel aspect. Wireless system 400 comprises a transmitting device 401 and a receiving device 402. During the channel sounding and feedback process, transmitting device 401 sends a sounding announcement (e.g., null data packet announcement (NDPA) 403) followed by a sounding packet (e.g., null data packet (NPD) 404,) to receiving device 402. NPDA 403 is transmitted first to inform the intended receiving devices (e.g., via STA INFO fields) and NDP 404 is then transmitted for the intended receiving devices to estimate the channel. Receiving device 402 then transmits a feedback packet 405 back to transmitting device 401 (with SIFS/RIFS). Receiving device 402 may transmit another feedback packet 407 upon a polling request 406 from transmitting device 401 (e.g., if feedback packet 405 was lost during transmission). Typically, the feedback information includes estimated CSI (beamforming report) and SNR information.

As illustrated in FIG. 4, sounding packet NPD 404 is used for channel sounding and measurement. The L-STF, L-LTF, L-SIG fields are used for setting up the protection field against legacy devices. The signaling information for the NDP signal is carried in the VHT-SIG-A 408 and the channel estimation is performed on the VHT-LTFS (Long Training Fields) 410. The wideband VHT signal uses duplicate signal format that replicates a 20 MHz waveform in each of the 20 MHz sub-channels that is being used. The signal content in VHT-SIG-A 408 is protected with a binary convolution code (BCC) and an eight-bit CRC (Cyclic Redundancy Code). The VHT-SIG-B symbol 411 carriers a fixed pattern and is binary convolution code (BCC) encoded at rate R=½ and mapped to a BPSK constellation. The VHT-STF 409 and VHT-LTFs 410 also carry fixed patterns but have no CRC protection.

There are various ways to monitor the quality of the sounding process by checking the sounding packet NDP 404. In a first embodiment, a conventional technique of checking CRC is utilized. Because replicated 20 MHz waveform is used in each 20 MHz sub-channel within the signal transmission bandwidth, the receiver checks the CRC for VHT-SIG-A 408 in all 20 MHz sub-channels. In a second embodiment, a technique of CCA (Clear Channel Assessment) prior to the arrival of the sounding packet is utilized. In a third embodiment, the fixed pattern in VHT-SIG-B symbol 411 is verified for monitoring the quality of the sounding signal. Checking the VHT-SIG-B pattern also provides detection of corruption of the sounding signal if interference occurs after VHT-SIG-A. In one novel aspect, in addition to the above embodiments, the fixed pattern in VHT-SIG-B symbol is utilized to determine the quality of channel sounding and measurement estimation.

FIG. 5 illustrates examples of fixed patterns of sounding signals used in an IEEE 802.11ac system. In IEEE 802.11ac, the dynamic bandwidth transmission scheme adopted in IEEE 802.11n is extended for the wider channel bandwidth (20 MHz, 40 MHz, 80 MHz, and 160 MHz). For a BSS (basic service set) of certain bandwidth, a valid transmission sub-channel shall have bandwidth equal to or smaller than the full bandwidth of the BSS and contains the designated primary sub-channel of the BSS. Based on the CCA sensing in the valid transmission bandwidths, the transmitter is allowed to transmit in any of the valid transmission sub-channels as long as the CCA indicates the sub-channel (or full channel) is idle. As a result, the valid sub-channels for a 160 MHz BSS can be the 20 MHz primary sub-channel, the 40 MHz primary sub-channel, the 80 MHz primary sub-channel, or the full 160 MHz channel. Likewise, for an 80 MHz BSS, the valid sub-channels can be the 20 MHz primary sub-channel, the 40 MHz primary sub-channel, or the full 80 MHz channel. For a 40 MHz BSS, the valid sub-channels can be the 20 MHz primary sub-channel or the full 40 MHz channel, as defined in IEEE 802.11n.

As illustrated in FIG. 5, during the sounding and feedback process, a different fixed pattern is used for the VHT-SIG-B symbol if a different channel bandwidth is used in transmitting the NDP sounding packet. If the NDP is transmitted over a 20 MHz channel, then the VHT-SIG-B symbol has a fixed pattern with 20 bits plus 6 tail bits, as showed in block 501. If the NDP is transmitted over a 40 MHz channel, then the VHT-SIG-B symbol has a fixed pattern with 21 bits plus 6 tail bits for each 20 MHz sub-channel, and repeated twice for the 40 MHz channel, as showed in block 502. If the NDP is transmitted over an 80 MHz channel, then the VHT-SIG-B symbol has a fixed pattern with 23 bits plus 6 tail bits for each 20 MHz sub-channel, repeated four times for the 80 MHz channel, plus 1 pad bit, as showed in block 503. Finally, if the NDP is transmitted over a 160 MHz channel (80 MHz+80 MHz), then the VHT-SIG-B symbol of the 80 MHz channel as shown in block 503 is repeated twice to form the fixed bit pattern of the VHT-SIG-B symbol (not shown).

Figure 6:
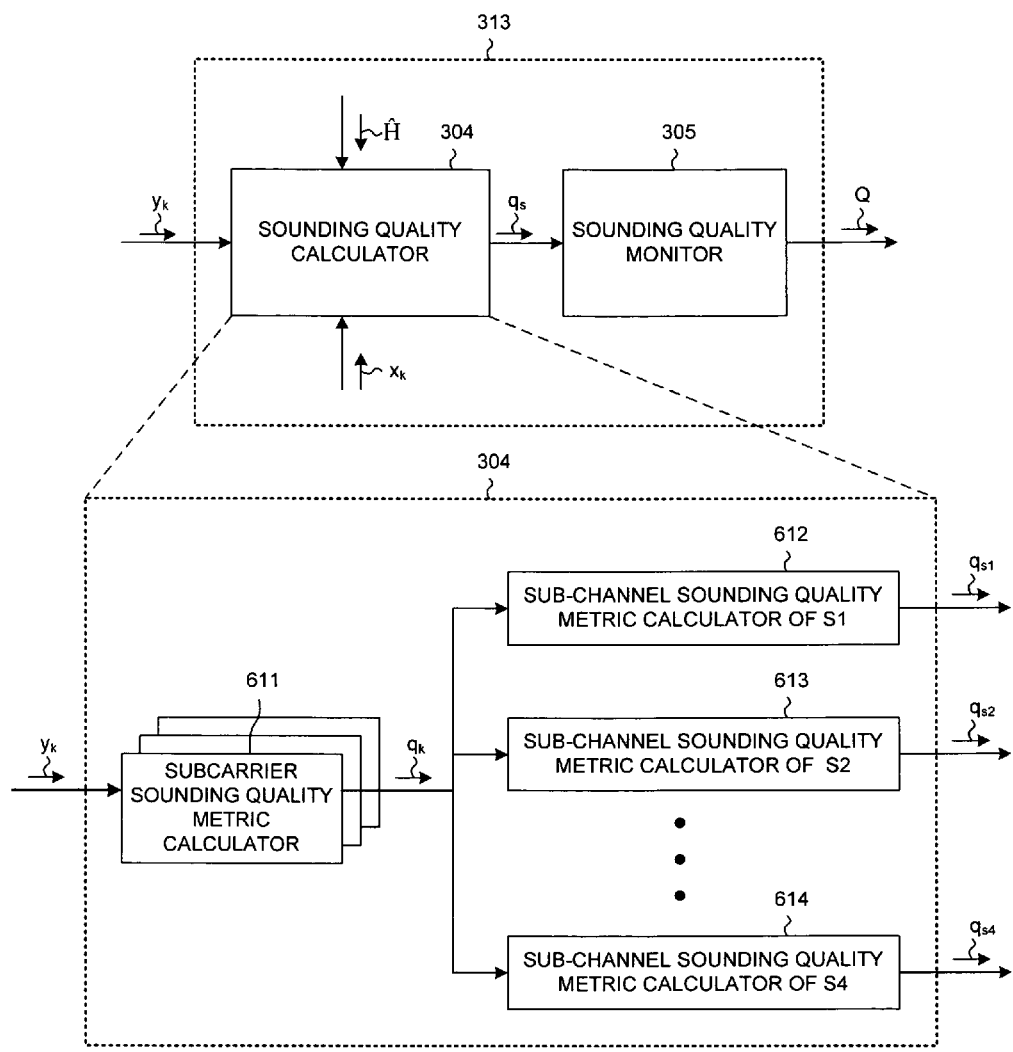
FIG. 6 illustrates one embodiment of a novel sounding quality calculation in an IEEE 802.11ac system.

Because each of the VHT-SIG-B symbols corresponding to a specific channel bandwidth has a fixed pattern known by the receiver, the receiver thus is able to utilize this feature to compute the channel estimation error of the VHT-SIG-B symbol and thereby determining sounding quality of the specific channel. FIG. 6 illustrates one embodiment of a novel sounding quality calculation by a receiver 300 of FIG. 3 in an IEEE 802.11ac system. Referring back to FIG. 3, receiver 300 has a sounding module 313 that comprises a sounding quality calculator 304 and a sounding quality monitor 305, which are replicated in FIG. 6. Sounding quality calculator 304 in turn comprises a plurality of subcarrier sounding quality metric calculators, and a plurality of sub-channel sounding quality metric calculators.

In wireless systems employ OFDM technology, each wireless channel contains a plurality of subcarriers (e.g., OFDM frequency tones). Suppose the VHT-SIG-B transmitted over a sub-channel containing N subcarrier is denoted as $x_k$ for subcarrier index k=0, 1, 2, ..., N−1, and the VHT-SIG-B received over the sub-channel is denoted as $y_k$ for subcarrier index k=0, 1, 2, ..., N−1. As illustrated in FIG. 6, sounding quality calculator 304 takes three inputs: the received sounding signal $y_k$ (converted to frequency domain by DFT 301), the estimated channel response matrix $\hat{H}_k$ (estimated by channel estimation module 302), and the transmitted sounding signal $x_k$ (generated by signal generator 303). Based on the three inputs, sounding quality calculator 304 computes the channel estimation error and outputs sounding quality metric $q_s$ for each valid sub-channel. The sounding quality metrics $q_s$ are then supplied onto sounding quality monitor 305 to generate sounding quality information Q.

For each subcarrier, each of the subcarrier sounding quality metric calculators (e.g., subcarrier quality metric calculator 611) computes the channel estimation error by comparing the received signal $y_k$ and the estimated received signal $\hat{y}_k$ to output the quality metric $q_k$ or $b_k$ for each subcarrier. Each of the sub-channel sounding quality metric calculators (e.g., sub-channel quality metric calculator 612, 613, and 614) takes $q_k$ or $b_k$ as input and outputs the sounding quality metric $q_s$ for each sub-channel. In one embodiment, the input-output relationships can be described mathematically as:

$$y_k = H_k x_k + n_k \tag{3}$$

$$\hat{y}_k = \hat{H}_k x_k \tag{4}$$

$$q_k(1) = \|y_k - \hat{y}_k\| = \Sigma_{m=1}^{M} \|y_k(m) - \hat{y}_k(m)\| \tag{5}$$

$$q_k(2) = \|y_k - \hat{y}_k\|^2 = \Sigma_{m=1}^{M} \|y_k(m) - \hat{y}_k(m)\|^2 \tag{6}$$

$$b_k = W y_k \tag{7}$$

where
- $y_k$ is the received sounding signal based on the transmit sounding signal $x_k$ and channel response matrix $H_k$ plus noise and interference $n_k$
- $\hat{y}_k$ is the estimated sounding signal based on the generated sounding signal $x_k$ and estimated channel response matrix $\hat{H}_k$
- $q_k(1)$ is one form of sounding quality metric, where m is an index for M receiving antennas
- $q_k(2)$ is another form of sounding quality metric, where m is an index for M receiving antennas
- $b_k$ is yet another form of sounding quality metric
- W is the equalization matrix derived from $\hat{H}_k$, i.e., W could be a zero-forcing equalizer or an minimum mean square error (MMSE) equalizer Note that the preferred embodiment of the sounding quality metric of each subcarrier can be one of the above metrics $q_k$ or $b_k$ or any corresponding approximated versions of these metrics. The sounding quality metrics $q_k$ or $b_k$ provides a measure of the channel estimation error, interferences, distortions and all noise sources, for each subcarrier k. Based on the sounding quality metrics for each subcarrier, the sub-channel quality metric calculators 612-614 compute the sub-channel sounding quality metric $q_s$ or $b_s$ for each sub-channel by combining the channel estimation errors for all subcarriers in the sub-channel. For example, calculator 612 computes sub-channel sounding quality metric $q_{s1}$ for the first sub-channel s1, calculator 613 computes sub-channel sounding quality metric $q_{s2}$ for the second sub-channel s2 ... and so on so forth for each valid sub-channel. Mathematically, the sub-channel sounding quality metrics $q_s$ are described as:

$$q_s = \Sigma_{k=k'}^{K'+k'-1} q_k \tag{8}$$

$$b_s = [b_{k'}, b_{k'+1}, \ldots, b_{K'+k'+1}] \tag{9}$$

where
- K' is the number of subcarriers of the considered sub-channel starts with subcarrier k'

The computed sub-channel quality metrics $q_s$ or $b_s$ are supplied onto sounding quality monitor 305. Sounding quality monitor 305 takes the input of the sub-channel quality metrics and outputs channel sounding quality information Q. In one example, each sub-channel quality metric is quantized and then compared to some thresholds. The thresholds could be determined based on long-term noise estimation, automatic gain control (AGC) settings, or other measured metrics. In another example, the sub-channel quality metrics are combined into a combined channel sounding quality metric, and the combined channel sounding metric is then compared with a corresponding threshold value. Channel sounding quality information Q is determined based on the comparison results, and then feedback to the transmitter.

Depending on the sounding quality calculation and monitoring result of the sounding process, the receiver can provide sounding quality information to the transmitter accordingly. In one preferred embodiment, the sounding quality information Q contains a quality indicator having a plurality of bits, and each bit represents a binary measure of the channel sounding and estimation quality for each valid sub-channel. In another preferred embodiment, the sounding quality information Q contains a quality indicator having a plurality of values, and each value represents a quantitative measure of the extent of the channel estimation error, interferences, distortions and all noise sources, for each valid sub-channel. If the channel sounding qualities for all valid sub-channels are poor, then a null VHT channel feedback frame can be sent back to the transmitter. In one advantageous aspect, the sounding quality information can be used by the transmitter for fast link adaptation and dynamic transmission bandwidth adjustment. With accurate sounding quality information for each valid sub-channel, the transmitter is able to enhance the robustness of link adaptation and dynamically determine the best transmission bandwidth.

Figure 7:
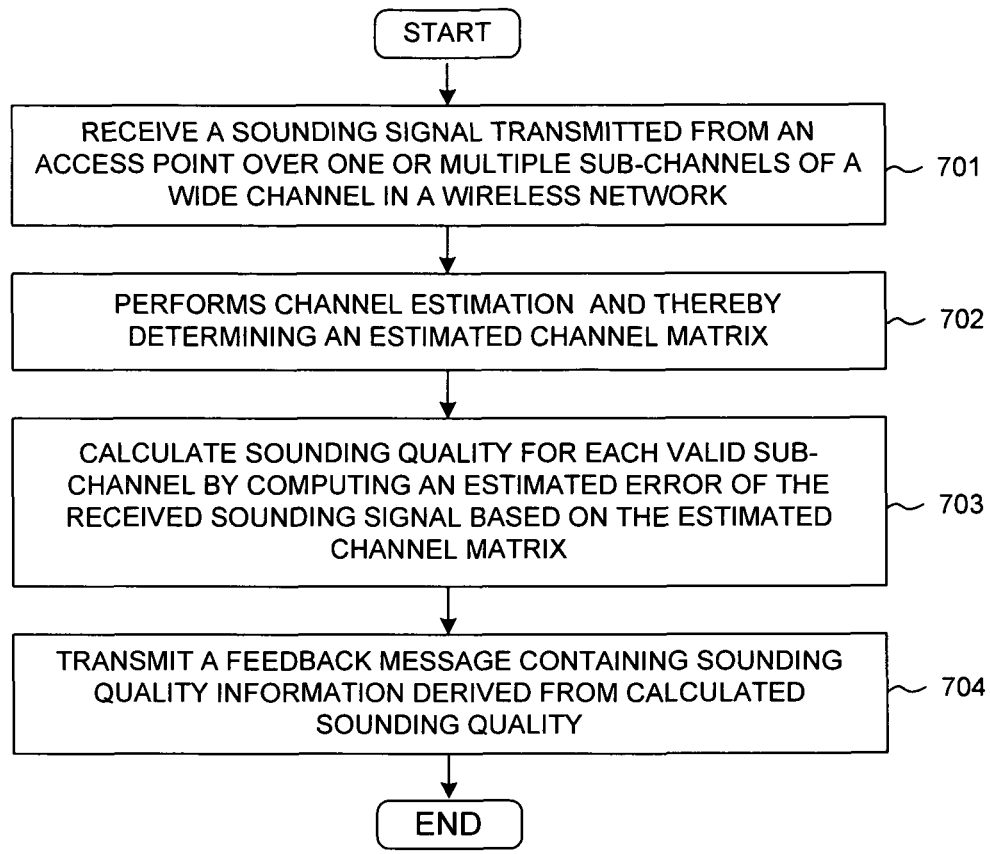
FIG. 7 is a flow chart of a method of providing channel sounding and estimation quality in accordance with one novel aspect.

FIG. 7 is a flow chart of a method of providing sounding and channel estimation quality in accordance with one novel aspect. In step 701, a mobile station (the receiver) receives a sounding signal transmitted from an access point (the transmitter) over a wide channel in a wireless network. The sounding signal is transmitted over one or multiple sub-channels of the wide channel. In step 702, the receiver performs channel estimation and determines an estimated channel response matrix. In step 703, the receiver calculates sounding quality for each valid sub-channel by computing an estimation error of the received sounding signal based on the estimated channel matrix. In step 704, the receiver transmits a feedback message to the transmitter. The feedback message contains sounding quality information derived from the calculated channel sounding quality. If the channel sounding qualities for all valid sub-channels are poor, then a null VHT (very high throughput) channel feedback frame can be sent back to the transmitter.

In one or more exemplary embodiments, the functions described above may be implemented in hardware, software, firmware, or any combination thereof. If implemented in software, the functions may be stored on or transmitted over as one or more instructions or code on a computer-readable (processor-readable) medium. Computer-readable media include both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that both can be used to carry or store desired program code in the form of instructions or data structures, and can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blue-ray disc where disks usually reproduce data magnetically, while discs reproduce data optically with lasers. Combinations of the above should also be included within the scope of computer-readable media.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) receiving a sounding signal transmitted from an access point over a wide channel in a wireless network, wherein the sounding signal is transmitted over one or multiple sub-channels of the wide channel, wherein each sub-channel comprises a plurality of subcarriers;
   (b) performing channel estimation by a receiver thereby determining an estimated channel matrix;
   (c) calculating sounding quality by computing an estimation error of the received sounding signal based on the estimated channel matrix for each valid sub-channel; and
   (d) transmitting a feedback message to the access point, wherein the feedback message contains sounding quality information derived from the sounding quality calculated in (c), and wherein a null channel feedback frame is contained in the feedback message if the calculated sounding quality for each valid sub-channel is below a threshold indicating poor channel estimation quality.

2. The method of claim 1, wherein the sounding signal contains a corresponding fixed pattern known by the receiver for each sub-channel, and wherein the calculating in (c) involves generating the corresponding fixed pattern at the receiver for each sub-channel.

3. The method of claim 1, wherein each sub-channel comprises a plurality of subcarriers, and wherein the calculating in (c) involves combining the estimation error for all subcarriers in each valid sub-channel.

4. The method of claim 3, wherein the sounding quality for each valid sub-channel is combined into a combined channel sounding quality metric.

5. The method of claim 1, wherein the sounding quality information is based on comparing the calculated sounding quality with a threshold.

6. The method of claim 5, wherein the threshold is determined based on long-term noise estimation, or automatic gain control (AGC) setting.

7. A wireless device, comprising:
   a receiving antenna that receives a sounding signal transmitted from an access point over a wide channel in a wireless network, wherein the sounding signal is transmitted over one or multiple sub-channels of the wide channel, wherein each sub-channel comprises a plurality of subcarriers;
   a channel estimation module that performs channel estimation thereby determining an estimated channel matrix;
   a sounding quality calculation module that calculates channel quality by computing an estimation error of the received sounding signal based on the estimated channel matrix for each valid sub-channel; and
   a transmitter that transmits a feedback message to the access point, wherein the feedback message contains sounding quality information derived from the calculated sounding quality for each valid sub-channel, and wherein a null channel feedback frame is contained in the feedback message if the calculated sounding quality for each valid sub-channel is below a threshold indicating poor channel estimation quality.

8. The device of claim 7, further comprising:
   a signal generator that generates a corresponding fixed pattern signal that is identical to the corresponding fixed pattern contained in the transmitted sounding signal for each sub-channel.

9. The device of claim 7, wherein each sub-cannel comprises a plurality of subcarriers, and wherein the calculating in (c) involves combining the estimation error for all subcarriers in each valid sub-channel.

10. The device of claim 9, wherein the sounding quality for each valid sub-channel is combined into a combined channel sounding quality metric.

11. The device of claim 7, further comprising:
    a sounding quality monitor module that derives the sounding quality information by comparing the calculated sounding quality with a threshold.

12. The device of claim 11, wherein the threshold is determined based on long-term noise estimation, or automatic gain control (AGC) setting.

13. A non-transitory computer-readable medium storing instructions that, when executed by a processor, cause the processor to perform a method, the method comprising:
    (a) receiving a sounding signal transmitted from an access point over a wide channel in a wireless network, wherein the sounding signal is transmitted over one or multiple sub-channels of the wide channel, wherein each sub-channel comprises a plurality of subcarriers;
    (b) performing channel estimation by a receiver thereby determining an estimated channel matrix;
    (c) calculating sounding quality by computing an estimation error of the received sounding signal based on the estimated channel matrix for each valid sub-channel; and
    (d) transmitting a feedback message to the access point, wherein the feedback message contains sounding quality information derived from the sounding quality calculated in (c), and wherein a null channel feedback frame is contained in the feedback message if the calculated sounding quality for each valid sub-channel is below a threshold indicating poor channel estimation quality.

14. The non-transitory computer-readable medium of claim 13, wherein the sounding signal contains a corresponding fixed pattern known by the receiver for each sub-channel, and wherein the calculating in (c) involves generating the corresponding fixed pattern at the receiver for each sub-channel.

15. The non-transitory computer-readable medium of claim 13, wherein each sub-cannel comprises a plurality of subcarriers, and wherein the calculating in (c) involves combining the estimation error for all subcarriers in each valid sub-channel.

16. The non-transitory computer-readable medium of claim 15, wherein the sounding quality for each sub-channel is combined into a combined channel sounding quality metric.

17. The non-transitory computer-readable medium of claim 13, wherein the sounding quality information is based on comparing the calculated sounding quality with a threshold.

18. The non-transitory computer-readable medium of claim 17, wherein the threshold is determined based on long-term noise estimation, or automatic gain control (AGC) setting.

\* \* \* \* \*

UNITED STATES PATENT AND TRADEMARK OFFICE
CERTIFICATE OF CORRECTION

PATENT NO. : 8,804,559 B2  
APPLICATION NO. : 13/373305  
DATED : August 12, 2014  
INVENTOR(S) : Liu et al.

It is certified that error appears in the above-identified patent and that said Letters Patent is hereby corrected as shown below:

IN THE CLAIMS:

Column 10, lines 21, the word "cannel" should be changed to --channel--.

The text of column 10, lines 21-24 should now read:

9. The device of claim 7, wherein each sub-channel comprises a plurality of subcarriers, and wherein the calculating in (c) involves combining the estimation error for all subcarriers in each valid sub-channel.

Column 10, line 64, the word "cannel" should be changed to --channel--.

The text of column 10, lines 63-67 should now read:

15. The non-transitory computer-readable medium of claim 13, wherein each sub-channel comprises a plurality of subcarriers, and wherein the calculating in (c) involves combining the estimation error for all subcarriers in each valid sub-channel.

Signed and Sealed this  
Twenty-seventh Day of January, 2015

Michelle K. Lee  
*Deputy Director of the United States Patent and Trademark Office*